United States Patent [19]

Lindacher

[11] Patent Number: 5,196,696
[45] Date of Patent: Mar. 23, 1993

[54] COUNTER ROTATING OPTICAL SCANNING UNIT WITH FRESNEL REFLECTION FILTERING

[75] Inventor: Joseph M. Lindacher, Duluth, Ga.

[73] Assignee: NCR Corporation, Dayton, Ohio

[21] Appl. No.: 833,238

[22] Filed: Feb. 10, 1992

[51] Int. Cl.⁵ ............................................. H01J 3/14
[52] U.S. Cl. ................................... 250/236; 250/566; 259/216; 235/467
[58] Field of Search ............... 250/235, 236, 566, 568; 235/467; 359/864, 877, 203, 216, 217, 218, 219

[56] References Cited

U.S. PATENT DOCUMENTS

| | | | |
|---|---|---|---|
| 3,602,571 | 8/1971 | Norris, Jr. | 350/7 |
| 3,632,871 | 1/1972 | Watkins et al. | 359/216 |
| 4,795,224 | 1/1989 | Goto | 350/6.3 |
| 4,870,274 | 9/1989 | Herbert et al. | 250/236 |
| 4,971,410 | 11/1990 | Wike, Jr. et al. | 235/467 |

FOREIGN PATENT DOCUMENTS 61-141417 6/1986 Japan ......................... 359/216

*Primary Examiner*—David C. Nelms
*Assistant Examiner*—K. Shami
*Attorney, Agent, or Firm*—Paul W. Martin

[57] ABSTRACT

An optical scanning unit which employs a mirrored spinner and a plurality of pattern mirrors that counter rotate to produce an omnidirectional scan pattern having a predetermined depth of field. The pattern mirrors are mounted within a drum which rotates freely within the scanner housing. The optical scanning unit employs a variable drive gear mechanism to counter rotate the spinner and pattern mirrors using a single motor. The optical scanning unit additionally employs a collection filtering system for filtering Fresnel reflections from light reflected from an article having a bar code label to be scanned. A plurality of scanning units may be arranged vertically or horizontally to form a multiple depth-of-field optical scanner.

19 Claims, 2 Drawing Sheets

COUNTER ROTATING OPTICAL SCANNING UNIT WITH FRESNEL REFLECTION FILTERING

BACKGROUND OF THE INVENTION

The present invention relates to optical scanners and more specifically to a counter rotating optical scanning unit.

Optical scanners are well known for their usefulness in retail checkout and inventory control. Optical scanners generally employ a laser, the light from which is focused and collimated to produce a scanning beam. A mirrored spinner directs the beam against a plurality of stationary mirrors, and a detector collects the beam after it is reflected by a bar code label. A motor rotates the spinner. The pattern produced by such a scanner is characterized by lines oriented at various angles to one another.

Industrial scanners require a truly omnidirectional pattern. Analysis of bar code label aspect ratios and sweep through speeds has shown that a symmetric pattern is optimum.

Industrial scanners must also be capable of scanning bar code information on items having a wide range in size.

Therefore, it would be desirable to provide an optical scanner which produces an omnidirectional pattern. It would also be desirable to provide a multiple depth of field optical scanner which is suited to the range of item sizes.

SUMMARY OF THE INVENTION

In accordance with the teachings of the present invention, a counter rotating optical scanning unit is provided. The scanning unit includes a laser for producing a beam. A housing has a side and an end containing an aperture for emitting the beam. A drum within the housing has an inner surface, an outer surface, a bottom surface, and an end containing an aperture for emitting the beam. A mirrored spinner is rotationally and centrally mounted to the bottom surface of the drum. Each one of a plurality of pattern mirrors is mounted at a predetermined angle for reflecting the beam from the spinner to an article having a bar code label to be scanned. A detector within the housing converts light reflected from the article into electrical signals based on the intensity of the reflected light.

The scanning unit further includes a drive apparatus within the housing for counter rotating the spinner and the pattern mirrors, including a roller frictionally contacting the outer surface of the drum, a variable drive gear mechanism coupled to the roller and the spinner, and a motor coupled to the variable drive gear mechanism for rotating the spinner in one direction and for rotating the pattern mirrors in a direction opposite to the direction of rotation of the spinner.

The optical scanning unit also includes a collection filtering system within the housing for filtering Fresnel reflections from the beam after it has reflected from the article, including a reflector mirror for condensing and changing the direction of the reflected light from the spinner and directing it to the detector, and a positive lens.

It is accordingly an object of the present invention to provide a counter rotating optical scanning unit.

It is another object of the present invention to provide a counter rotating scanning unit which produces an omnidirectional pattern.

It is another object of the present invention to provide a multiple depth-of-field optical scanner employing a plurality of counter rotating scanning units, staggered vertically or horizontally so as to cover a predetermined scan volume.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
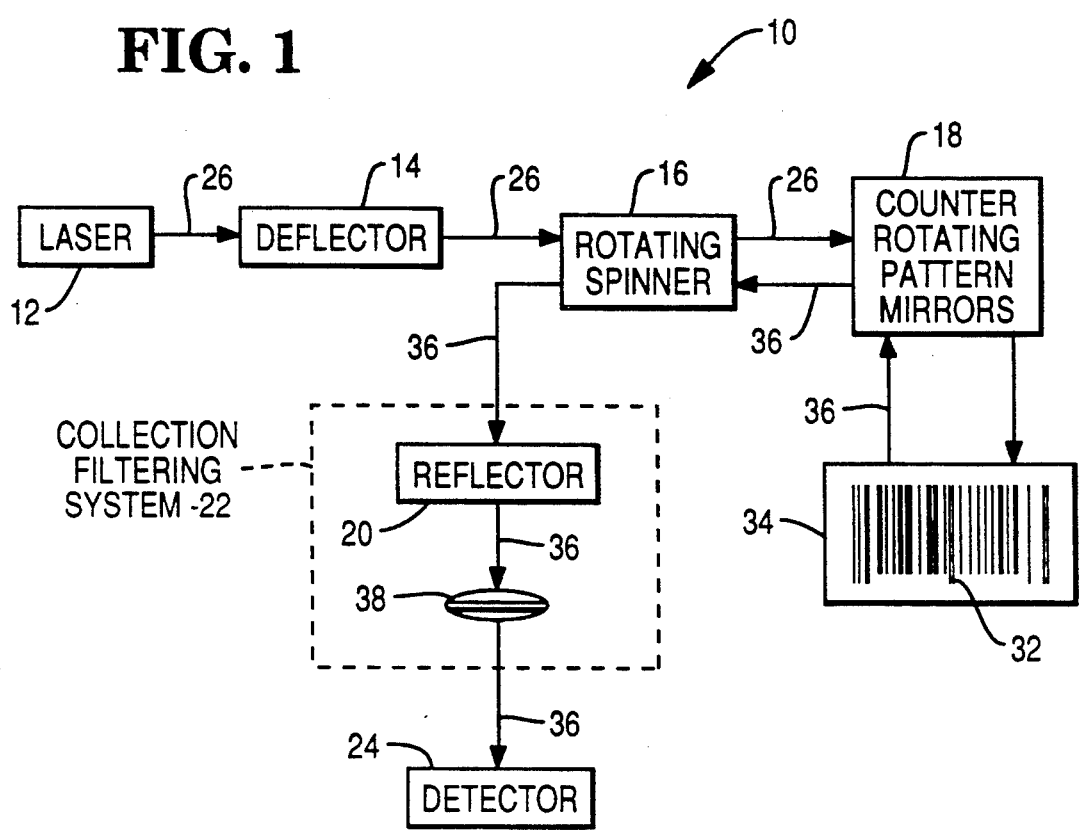
FIG. 1 is a block diagram of the scanning unit of the present invention.

Referring now to FIG. 1, optical scanning unit 10 of the present invention includes laser 12, deflector 14, rotating spinner 16, counter rotating pattern mirrors 18, collection filtering system 22, and detector 24. Laser 12 includes a laser diode, a focusing lens, and a collimating aperture, or a laser tube and focusing lens.

Deflector 14 has a mirrored surface for deflecting beam 26 towards rotating spinner 16.

Figure 2:
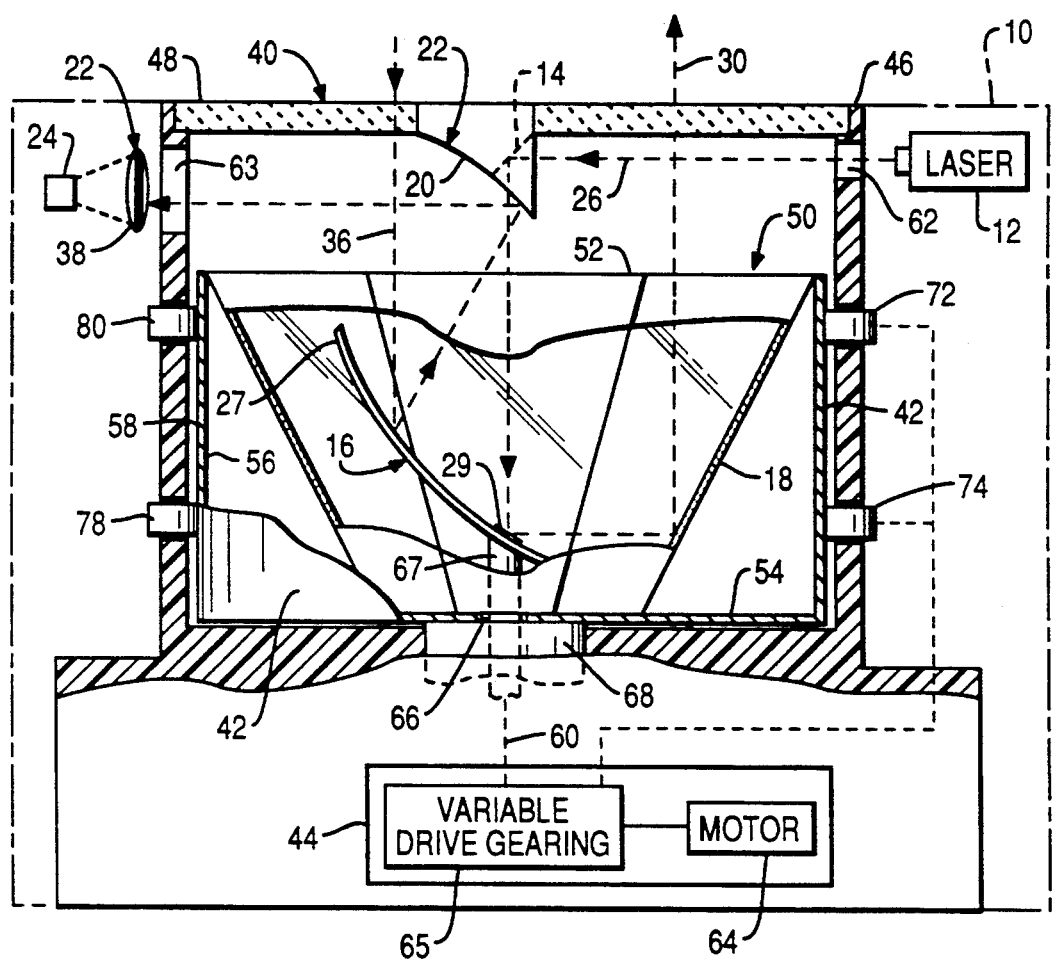
FIG. 2 is a side view of the scanning unit with sections broken away.

Beam 26 contacts rotating spinner 16. Preferably, rotating spinner 16 has an elliptical mirrored surface 27 for collecting reflected light 36 and a flat section 29 for directing beam 26 during normal operation (FIG. 2).

As it rotates, spinner 16 directs beam 26 against counter rotating pattern mirrors 18, which produce scan lines 30.

Scan lines 30 impact bar code label 32 of item 34 and the reflected light 36 is received by counter rotating pattern mirrors 18, which redirect reflected light 36 towards spinner 16.

Spinner 16 directs reflected light 36 at collection filtering system 22, which includes reflector 20 and lens 38. Collection filtering system 22 serves to obscure detector 24 from Fresnel reflections. Reflector 20 condenses reflected light 36 and changes its direction, thereby obscuring it from Fresnel reflections. Preferably, reflector 20 is a curved mirror with an elliptical shape.

Lens 38 works in conjunction with reflector 20 to restrict the field of view of detector 24, which provides a small F number. In addition, it serves to minimize stray Fresnel reflections by reducing the cross-sectional area of reflected light 36 as it approaches detector 24. Lens 38 may be a single positive lens or a plurality of lenses.

Detector 24 generates signals representing the intensity of light 36.

Figure 3:
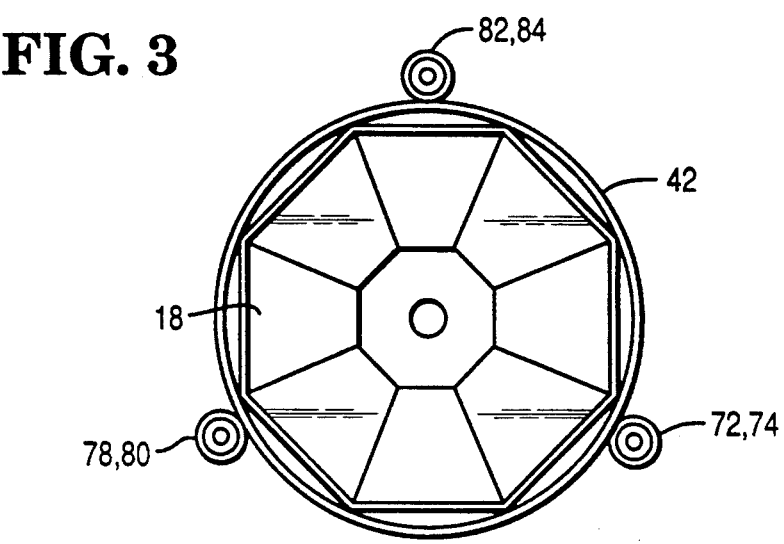
FIG. 3 is a top view of the scanning unit of FIG. 2.

Turning now to FIGS. 2 and 3, optical scanning unit 10 is shown in more detail. Unit 10 includes housing 40, drum 42, and drive apparatus 44 for counter rotating spinner 16 and pattern mirrors 18.

Housing 40 is generally box-like in shape. It has an emitting end 46 containing window 48 through which outgoing scan lines 30 and incoming reflected light 36 pass. Deflector 14 and reflector 20 are centrally mounted in a fixed position within emitting end 46.

Drum 42 is generally cylindrical in shape and sits within a correspondingly shaped cavity 50, which is preferably about three inches deep. Drum 42 includes bottom surface 54, inner surface 56, and outer surface 58, and emitting end 52 oriented in the same direction as end 46 of housing 40. Pattern mirrors 18 are mounted at predetermined angles to bottom and inner surfaces 54 and 56. They are arranged concentrically around axis 60 of drum 42. Drum 42 is shorter than the length of cavity 50 to allow incoming beam 26 from laser 12 to pass through aperture 62 and outgoing light 36 to pass through aperture 63 on its way to detector 24. Drum 42 rests on base member 68 and rotates about axis 60. Drum 42 includes a central aperture 66 through which shaft 67 of spinner 16 passes.

Drive apparatus 44 preferably employs motor 64 and variable drive gearing 65 for rotating spinner 16 in one direction and for rotating pattern mirrors 18 in the opposite direction. Two motors may also be employed, one to rotate spinner 16 and one to rotate pattern mirrors 18, although such an embodiment would suffer from higher cost.

The ratio of the speed of spinner 16 to the speed of pattern mirrors 18 may be adjusted by an operator based upon the aspect ratios of the bar code labels to be scanned. For high aspect bar code labels, the speed ratio may be as low as about eight-to-one. A preferred average ratio would be about fifteen-to-one.

Motor 64 is coupled to drum 42 through drive rollers 72 and 74. Rollers 78-84 are added to maintain the alignment of pattern mirrors 18, thus allowing unit 10 to be oriented in any desired direction.

Figure 4:
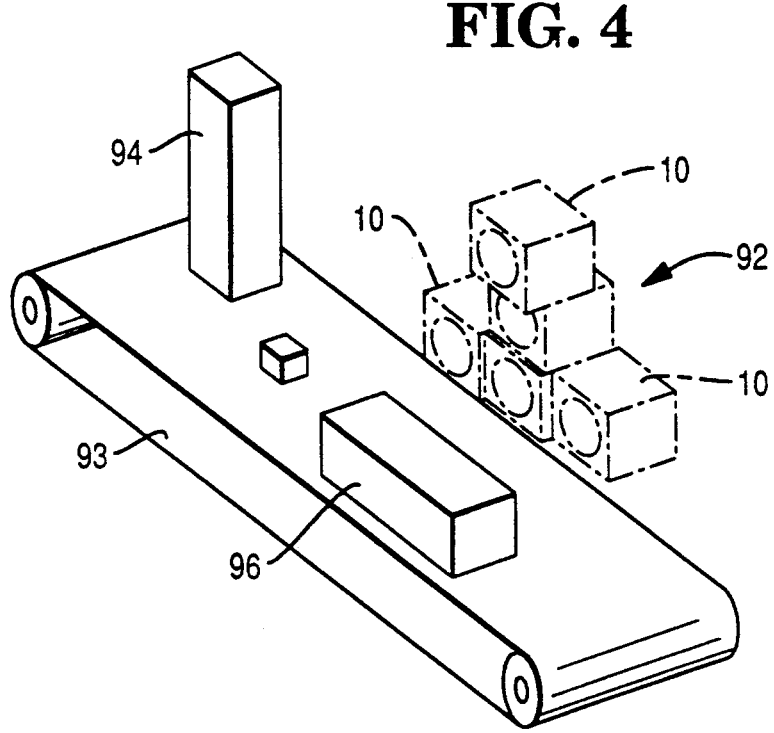
FIG. 4 is a perspective view showing a plurality of scanning units arranged to form a multiple depth of field optical scanner.

Referring now to FIG. 4, a plurality of scanning units 10, all having the same depth of field, may be arranged to cover a predetermined scan volume over a transport mechanism 93 so as to form a multiple depth-of-field optical scanner 92. The scan volume is determined by the size of the articles to be scanned. Thus, if a tall item 94 is to be scanned, units 10 may be vertically staggered, one on top of the other. Staggering would be required to accommodate the uncertainty in distance from scanner 92 as item 94 passes by. Likewise, for longer articles 96, units 10 may be horizontally staggered. Pattern overlap between units 10 increases the probability of reading a bar code label facing scanner 92.

Although the present invention has been described with particular reference to certain preferred embodiments thereof, variations and modifications of the present invention can be effected within the spirit and scope of the following claims.

What is claimed is:

1. An optical scanner comprising:
   a laser diode for producing a laser beam;
   a mirrored spinner;
   a plurality of pattern mirrors for reflecting the laser beam from the spinner to an article having a bar code label to be scanned, said beam reflecting from the label back to the scanner;
   a collection filtering system for filtering Fresnel reflections from the beam after it has reflected from the article; and
   means for counter rotating the spinner and the pattern mirrors.

2. The optical scanner as recited in claim 1, further comprising a housing, containing the mirrored spinner and the pattern mirrors, and having a side and an end containing an aperture for emitting the beam.

3. The optical scanner as recited in claim 2, further comprising a drum within the housing having an inner surface, an outer surface, a bottom surface, and an end containing an aperture for emitting the beam, wherein the pattern mirrors are mounted at predetermined angles to the inner surface and the bottom surface.

4. The optical scanner as recited in claim 3, wherein the counter rotating means comprises:
   a roller frictionally in contact with the outer surface of the drum;
   a variable drive gear mechanism coupled to the roller and the spinner; and
   a motor coupled to the variable drive mechanism for rotating the spinner in one direction and for rotating the roller such that the drum rotates in another direction opposite to the one direction.

5. The optical scanner as recited in claim 4, wherein the counter rotating means further comprises another roller mounted to the housing and frictionally contacting the outer surface of the drum for maintaining alignment of the drum.

6. The optical scanner as recited in claim 5, further comprising:
   a deflector mirror within the housing for deflecting the beam from the laser diode towards the mirrored spinner;
   a detector within the housing for converting light reflected from the article into electrical signals based on the intensity of the reflected light; and
   a reflector mirror within the housing for reflecting the reflected light from the spinner to the detector.

7. The optical scanner as recited in claim 6, wherein the mirrored spinner comprises:
   a flat mirror portion for directing the beam from the deflector mirror to the article; and
   an elliptical mirror portion coupled to the flat mirror portion for collecting light from the article.

8. The optical scanner as recited in claim 1, wherein the collection filtering system comprises:
   a reflector mirror within the housing for condensing and changing the direction of the reflected light from the spinner; and
   a positive lens between the reflector and the detector.

9. The optical scanner as recited in claim 8, wherein the reflector mirror is curved.

10. The optical scanner as recited in claim 8, wherein the collection filtering system further comprises:
    another lens between the reflector and the detector.

11. An optical scanner comprising:
    a laser for producing a beam;
    a housing having a side and an end containing an aperture for emitting the beam;
    a drum within the housing having an inner surface, an outer surface, a bottom surface, and an end containing an aperture for emitting the beam;
    a mirrored spinner rotationally and centrally mounted to the bottom surface of the drum;
    a plurality of pattern mirrors mounted at predetermined angles to the inner surface and the bottom surface for reflecting the beam from the spinner to an article having a bar code label to be scanned, said beam reflecting from the label back to the scanner;

a detector within the housing for converting light reflected from the article into electrical signals based on the intensity of the reflected light;

means within the housing for counter rotating the spinner and the pattern mirrors, including a roller frictionally contacting the outer surface of the drum, a variable drive gear mechanism coupled to the roller and the spinner, and a motor coupled to the variable drive gear mechanism for rotating the spinner in one direction and for rotating the pattern mirrors in a direction opposite to the direction of rotation of the spinner; and a collection filtering system within the housing for filtering Fresnel reflections from the beam after it has reflected from the article, including a curved reflector mirror within the housing for condensing and changing the direction of the reflected light from the spinner and a positive lens between the reflector mirror and the detector.

12. A multiple depth of field optical scanner comprising a plurality of scanning units having a predetermined depth of field, the scanning units being staggered at predetermined distances from a scan volume so as to produce minimum and maximum depths of field within the scan volume, the scanning units including mirrored spinner rotating in one direction and a plurality of pattern mirrors rotating in a direction opposite to the one direction, and a collection filtering system for filtering out Fresnel reflections from light reflected from an article having a bar code label to be scanned.

13. The multiple depth of field optical scanner as recited in claim 12, wherein the scanning units are vertically staggered.

14. The multiple depth of field optical scanner as recited in claim 12, wherein the scanning units are horizontally staggered.

15. A method for producing an omnidirectional scan pattern comprising the steps of:

providing a laser for producing a beam;

providing a mirrored spinner;

providing a plurality of pattern mirrors around the mirrored spinner for reflecting the laser beam from the spinner to an article having a bar code label to be scanned, said beam reflecting from the label back to the spinner;

rotating the spinner in one direction;

filtering Fresnel reflections from the beam after it has reflected from the article; and rotating the pattern mirrors in another direction opposite the one direction.

16. The method as recited in claim 15, further comprising the steps of:

deflecting the laser beam towards the mirrored spinner; and reflecting the beam from the spinner after it has reflected from the article towards a detector.

17. A method for producing a multiple depth of field scan pattern comprising the steps of:

providing a plurality of optical scanning units having a predetermined depth of field, including a mirrored spinner rotating in one direction and a plurality of pattern mirrors rotating in a direction opposite to the one direction and a collection filtering system for filtering out Fresnel reflections from light reflected from an article having a bar code label to be scanned;

staggering the scanning units at predetermined distances from a scan volume so as to produce minimum and maximum depths of field within the scan volume.

18. The method as recited in claim 17, wherein the step of staggering comprises the substep of:

stacking the scanning units in a vertical direction.

19. The method as recited in claim 17, wherein the step of staggering comprises the substep of:

arranging the scanning units in a horizontal direction.

* * * * *